United States Patent
Breijo Baullosa et al.

(10) Patent No.: US 10,664,328 B2
(45) Date of Patent: May 26, 2020

(54) CALENDAR ENTRY CREATION BY INTERACTION WITH MAP APPLICATION

(71) Applicant: International Business Machines Corporation, Armonk, NY (US)

(72) Inventors: Eduardo M. Breijo Baullosa, Morrisville, NC (US); Dana L. Price, Surf City, NC (US); Lori L. Adington, Raleigh, NC (US); Mary A. Curran, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/985,755

(22) Filed: May 22, 2018

(65) Prior Publication Data

US 2019/0361754 A1    Nov. 28, 2019

(51) Int. Cl.
| | | |
|---|---|---|
| *G06F 9/54* | (2006.01) | |
| *H04W 4/021* | (2018.01) | |
| *G06F 16/29* | (2019.01) | |
| *G06F 16/34* | (2019.01) | |
| *G06F 16/25* | (2019.01) | |
| *G06F 16/9537* | (2019.01) | |

(52) U.S. Cl.
CPC .......... *G06F 9/542* (2013.01); *G06F 16/252* (2019.01); *G06F 16/29* (2019.01); *G06F 16/34* (2019.01); *G06F 16/9537* (2019.01); *H04W 4/021* (2013.01)

(58) Field of Classification Search
CPC .......... G06F 9/542; G06F 16/29; G06F 16/34; G06F 16/252; G06F 16/9537; H04W 4/021
See application file for complete search history.

(56) References Cited

U.S. PATENT DOCUMENTS

| | | |
|---|---|---|
| 7,673,248 B2 | 3/2010 | Narayanaswami |
| 8,983,500 B2 | 3/2015 | Yach |
| 9,175,964 B2 | 11/2015 | Forstall et al. |
| 9,444,774 B2 | 9/2016 | Krishna et al. |
| 9,485,620 B2 | 11/2016 | Henson et al. |
| 2008/0109718 A1 | 5/2008 | Narayanaswami |

(Continued)

OTHER PUBLICATIONS

Popp, Melissa, "Add Events to Google Calendar From Anywhere in the Web", maketecheasier, Aug. 17, 2013, <https://www.maketecheasier.com/add-events-google-calendar-from-web/>, 9 pages, © 2007—2018 Uqnic Network Pte Ltd.

(Continued)

*Primary Examiner* — Charles E Anya
(74) *Attorney, Agent, or Firm* — Edward J. Wixted, III

(57) ABSTRACT

In an approach to creating an electronic calendar entry, one or more computer processors receive a selection of a location in a map application from a first device associated with a first user. In response to receiving a selection of a location in a map application from the first device associated with the first user, the one or more computer processors create a first calendar entry in the electronic calendar application associated with the first user. The one or more computer processors input information corresponding to the selected location in the first calendar entry. The one or more computer processors store the first calendar entry.

19 Claims, 5 Drawing Sheets

(56) References Cited

U.S. PATENT DOCUMENTS

| | | | |
|---|---|---|---|
| 2008/0195455 A1* | 8/2008 | May | G06F 15/02 705/7.18 |
| 2009/0006994 A1* | 1/2009 | Forstall | G01C 21/20 715/764 |
| 2009/0036148 A1 | 2/2009 | Yach | |
| 2010/0082239 A1* | 4/2010 | Hardy | G01C 21/26 701/532 |
| 2010/0214876 A1 | 8/2010 | Siegel | |
| 2012/0197523 A1* | 8/2012 | Kirsch | G01C 21/362 701/426 |
| 2013/0138637 A1* | 5/2013 | Bachtiger | G06F 16/43 707/723 |
| 2013/0238241 A1* | 9/2013 | Chelotti | G01C 21/3617 701/533 |
| 2014/0095234 A1* | 4/2014 | Johnson | G06Q 10/02 705/7.12 |
| 2014/0343978 A1* | 11/2014 | Bisht | G06Q 10/109 705/5 |
| 2015/0006077 A1* | 1/2015 | Baid | G01C 21/3697 701/533 |
| 2015/0095086 A1 | 4/2015 | Gopinath et al. | |
| 2015/0169182 A1* | 6/2015 | Khoe | G06F 3/0481 715/781 |
| 2015/0271126 A1* | 9/2015 | Menayas | H04W 4/21 709/206 |
| 2016/0357422 A1* | 12/2016 | Milden | G06F 3/04847 |
| 2016/0357768 A1* | 12/2016 | Strong | H04W 4/021 |
| 2017/0115828 A1* | 4/2017 | Langlois | H04M 1/6091 |
| 2018/0121881 A1* | 5/2018 | Kumar | G06F 9/453 |
| 2018/0349489 A1* | 12/2018 | Toudji | G06F 17/28 |

OTHER PUBLICATIONS

"A Method and Apparatus to Identify to Optimize the Calendar Display in the Presence of Shared Calendars", An IP.com Prior Art Database Technical Disclosure, Authors et. al.: Disclosed Anonymously, IP.com No. IPCOM000235691D, IP.com Electronic Publication Date: Mar. 20, 2014, 7 pages.

"Method to Create a Virtual World Event within a Calendar Application", An IP.com Prior Art Database Technical Disclosure, Authors et. al.: IBM, Original Publication Date: Feb. 29, 2008, IP.com No. IPCOM000168197D, IP.com Electronic Publication Date: Feb. 29, 2008, 3 pages.

"Method and System for Auto-Completion of Calendar Entries", An IP.com Prior Art Database Technical Disclosure, Authors et. al.: Disclosed Anonymously, IP.com No. IPCOM000222356D, IP.com Electronic Publication Date: Sep. 26, 2012, 4 pages.

"User experience enhancements for location based calendar", An IP.com Prior Art Database Technical Disclosure, Authors et. al.: IBM, Original Publication Date: Apr. 2, 2009, IP.com No. IPCOM000181431D, IP.com Electronic Publication Date: Apr. 2, 2009, 7 pages.

"29 Extensions and Tools to Supercharge Your Google Calendar", Hubworks, Business Management Apps, Dec. 1, 2016, <https://hubworks.com/29-extensions-and-tools-to-supercharge-your-google-calendar.html>, 24 pages.

Mell et al., "The NIST Definition of Cloud Computing", Special Publication 800-145, Sep. 2011, 7 pages.

* cited by examiner

US 10,664,328 B2

CALENDAR ENTRY CREATION BY INTERACTION WITH MAP APPLICATION

BACKGROUND OF THE INVENTION

The present invention relates generally to the field of electronic calendaring, and more particularly to creating a calendar entry based on interaction with a map application.

A Web Map Service (WMS) is a standard protocol for serving (over the Internet) georeferenced map images which a map server generates using data from a geographic information system (GIS) database. GIS describes any information system that integrates, stores, edits, analyzes, shares, and displays geographic information. Global positioning system (GPS) navigation software usually falls into one of the following two categories: navigation with route calculation and directions from the software to the user of the route to take, based on a vector-based map, normally for motorized vehicles, and navigation tracking, often with a map "picture" in the background, but showing where the user has been, and allowing "routes" to be preprogrammed, giving a line the user can follow on a screen.

Calendaring software is software that minimally provides users with an electronic version of a calendar. Additionally, the software may provide an appointment book, address book, and/or contact list. These tools are an extension of many of the features provided by time management software such as desk accessory packages and computer office automation systems. Calendaring is a standard feature of many PDAs, EDAs, and smartphones, and also of many office suites for personal computers. The software may be a local application designed for individual use or may be a networked package that allows for the sharing of information between users.

SUMMARY

Embodiments of the present invention disclose a method, a computer program product, and a system for creating an electronic calendar entry. The method may include one or more computer processors receiving a selection of a location in a map application from a first device associated with a first user. In response to receiving a selection of a location in a map application from the first device associated with the first user, the one or more computer processors create a first calendar entry in the electronic calendar application associated with the first user. The one or more computer processors input information corresponding to the selected location in the first calendar entry. The one or more computer processors store the first calendar entry.

DETAILED DESCRIPTION

While a user views a map or navigation application, instances may arise in which the user sees a location on the map for which the user wants to create an event on an electronic calendar. Currently, the user has to leave the map application and transfer data to a calendar application, i.e., via cut and paste operations, in order to use the location information in a calendar entry. Embodiments of the present invention recognize that efficiency may be gained by enabling a user to create a calendar entry based on a location displayed on an electronic map without leaving the map application, thereby tying the natural interaction with the map into the calendar event generation, and integrating the creation of calendar entries from a map application to a calendar application. Implementation of embodiments of the invention may take a variety of forms, and exemplary implementation details are discussed subsequently with reference to the Figures.

Figure 1:
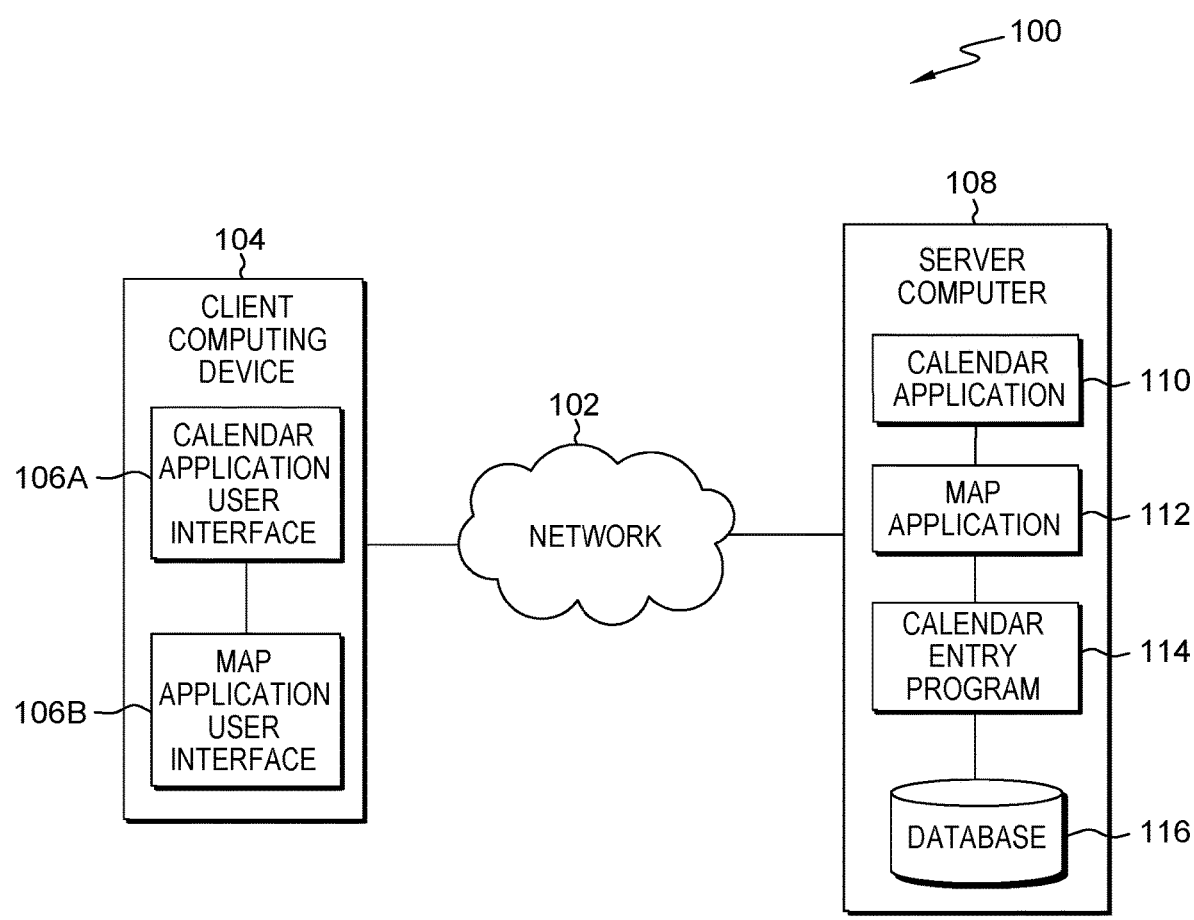
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes client computing device 104 and server computer 108, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between client computing device 104, server computer 108, and other computing devices (not shown) within distributed data processing environment 100.

Client computing device 104 can be a laptop computer, a tablet computer, a smart phone, or any programmable electronic device capable of communicating with various components and devices within distributed data processing environment 100, via network 102. Client computing device 104 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment where the head mounted display enables augmented reality, a user may be able to interact with user interface(s) 106 via overlaid virtual graphics viewed in the head mounted display. In general, client computing device 104 represents one or more programmable electronic devices or combination of programmable electronic devices capable of executing machine readable program instructions and communicating with other computing devices (not shown) within distributed data processing environment 100 via a network, such as network 102. Client computing device 104 represents one or more devices associated with a user. Client computing device 104 includes user interface(s) 106.

User interface(s) 106 provide an interface between a user of client computing device 104 and server computer 108. In one embodiment, user interface(s) 106 may be graphical user interfaces (GUI) or web user interfaces (WUI) and can display text, documents, web browser windows, user options, application interfaces, and instructions for operation, and include the information (such as graphic, text, and sound) that a program presents to a user and the control sequences the user employs to control the program. In another embodiment, user interface(s) 106 may also be mobile application software that provides an interface between a user of client computing device 104 and server computer 108. Mobile application software, or an "app," is a computer program designed to run on smart phones, tablet computers and other mobile devices. User interface(s) 106 may be one or more user interfaces that interact with calendar application 110, map application 112, and calendar entry program 114, either collectively or individually. Calendar application user interface 106A enables a user of client computing device 104 to perform a plurality of functions within calendar application 110, including, but not limited to, inputting details such as date, time and location in a calendar entry and sending meeting invitations. Map application user interface 106B enables a user of client computing device 104 to perform a plurality of functions within map application 112, including, but not limited to, viewing a map, providing a navigation route, and creating a calendar entry while using map application 112 for viewing a map and/or navigation. In one embodiment, calendar application user interface 106A and map application user interface 106B may reside on different client computing devices (not shown). For example, if client computing device 104 is a GPS device integrated into the user's car, then map application user interface 106B may reside on client computing device 104 while calendar application user interface 106A resides on the user's smartphone or laptop.

Server computer 108 can be a standalone computing device, a management server, a web server, a mobile computing device, or any other electronic device or computing system capable of receiving, sending, and processing data. In other embodiments, server computer 108 can represent a server computing system utilizing multiple computers as a server system, such as in a cloud computing environment. In another embodiment, server computer 108 can be a laptop computer, a tablet computer, a netbook computer, a personal computer (PC), a desktop computer, a personal digital assistant (PDA), a smart phone, or any programmable electronic device capable of communicating with client computing device 104 and other computing devices (not shown) within distributed data processing environment 100 via network 102. In another embodiment, server computer 108 represents a computing system utilizing clustered computers and components (e.g., database server computers, application server computers, etc.) that act as a single pool of seamless resources when accessed within distributed data processing environment 100. Server computer 108 includes calendar application 110, map application 112, calendar entry program 114, and database 116. Server computer 108 may include internal and external hardware components, as depicted and described in further detail with respect to FIG. 3.

Calendar application 110 is one of a plurality of software programs known in the art that enables a user to track events in the past, present, or future. Calendar application 110 may be web based or a software application which utilizes application programming interfaces (APIs) and captures information about an event by, for example, receiving input from a user regarding details of an event. In the depicted embodiment, calendar application 110 resides on server computer 108. In another embodiment, calendar application 110 may reside on client computing device 104. In a further embodiment, calendar application 110 may reside elsewhere within distributed data processing environment 100 provided that calendar entry program 114 has access to calendar application 110.

Map application 112 is one of a plurality of software programs known in the art for displaying an electronic map on a computing device, such as client computing device 104. In one embodiment, map application 112 includes navigation capability. In the embodiment, the navigation capability may be enabled by a GPS sensor included in client computing device 104. In some embodiments, map application 112 includes information corresponding to locations on displayed map areas. Map information may include, but is not limited to, an address, a location description, GPS coordinates, or information of relative proximity to another location or object. In the depicted embodiment, map application 112 resides on server computer 108. In another embodiment, map application 112 may reside on client computing device 104. In a further embodiment, map application 112 may reside elsewhere within distributed data processing environment 100 provided that calendar entry program 114 has access to map application 112.

In the depicted embodiment, calendar application 110 and map application 112 are standalone software programs. In another embodiment, the functionality of calendar application 110 and map application 112 may be integrated into a single software program.

Calendar entry program 114 combines the functionality of calendar application 110 and map application 112 to enable a user to create a calendar entry based on a selected location on an electronic map. In one embodiment, calendar entry program 114 is a standalone program. In another embodiment, the function of calendar entry program 114 may be integrated into map application 112. In a further embodiment, the function of calendar entry program 114 may be integrated into calendar application 110. In the depicted embodiment, calendar entry program 114 resides on server computer 108. In another embodiment, calendar entry program 114 may reside on client computing device 104. In a further embodiment, calendar entry program 114 may reside elsewhere within distributed data processing environment 100 provided that calendar entry program 114 has access to calendar application 110, map application 112, and database 116. Calendar entry program 114 receives a selection of a location in map application 112, and prompts a user with options associated with the selection. Calendar entry program 114 receives a selection of an option for a calendar entry. Calendar entry program 114 opens calendar application 110. Calendar entry program 114 creates a new calendar entry and inputs the location selected from map application 112 in the new calendar entry of calendar application 110. Calendar entry program 114 saves the new calendar entry. Calendar entry program 114 closes calendar application 110 and returns to map application 112. Calendar entry program 114 is depicted and described in further detail with respect to FIG. 2.

Database 116 is a repository for data used by calendar application 110, map application 112, and calendar entry program 114. In the depicted embodiment, database 116 resides on server computer 108. In another embodiment, database 116 may reside on client computing device 104 or elsewhere within distributed data processing environment 100 provided calendar application 110, map application 112, and calendar entry program 114 have access to database 116. A database is an organized collection of data. Database 116 can be implemented with any type of storage device capable of storing data and configuration files that can be accessed and utilized by calendar entry program 114, such as a database server, a hard disk drive, or a flash memory. Database 116 stores data used by calendar entry program 114, such as metadata associated with a selected location within map application 112. Database 116 may also store data used by calendar application 110, including, but not limited to, dates, times, locations, invitees, etc., associated with a calendar entry. Database 116 may also store data used by map application 112, including, but not limited to, points of interest on one or more electronic maps. Database 116 may be a geographic information system (GIS) database. Database 116 may also store one or more user preferences associated with default or pre-populated fields in a calendar entry, for example, entry title, date, start and end times, reminder notifications, invitee list, notes, attachments, etc. Database 116 may also store one or more user preferences associated with use of calendar entry program 114, such as choosing which fields to pre-populate based on which device associated with the user is currently in use or choosing which calendar application is preferred for various types of calendar entries, i.e., a business meeting versus having coffee with a friend.

Figure 2:
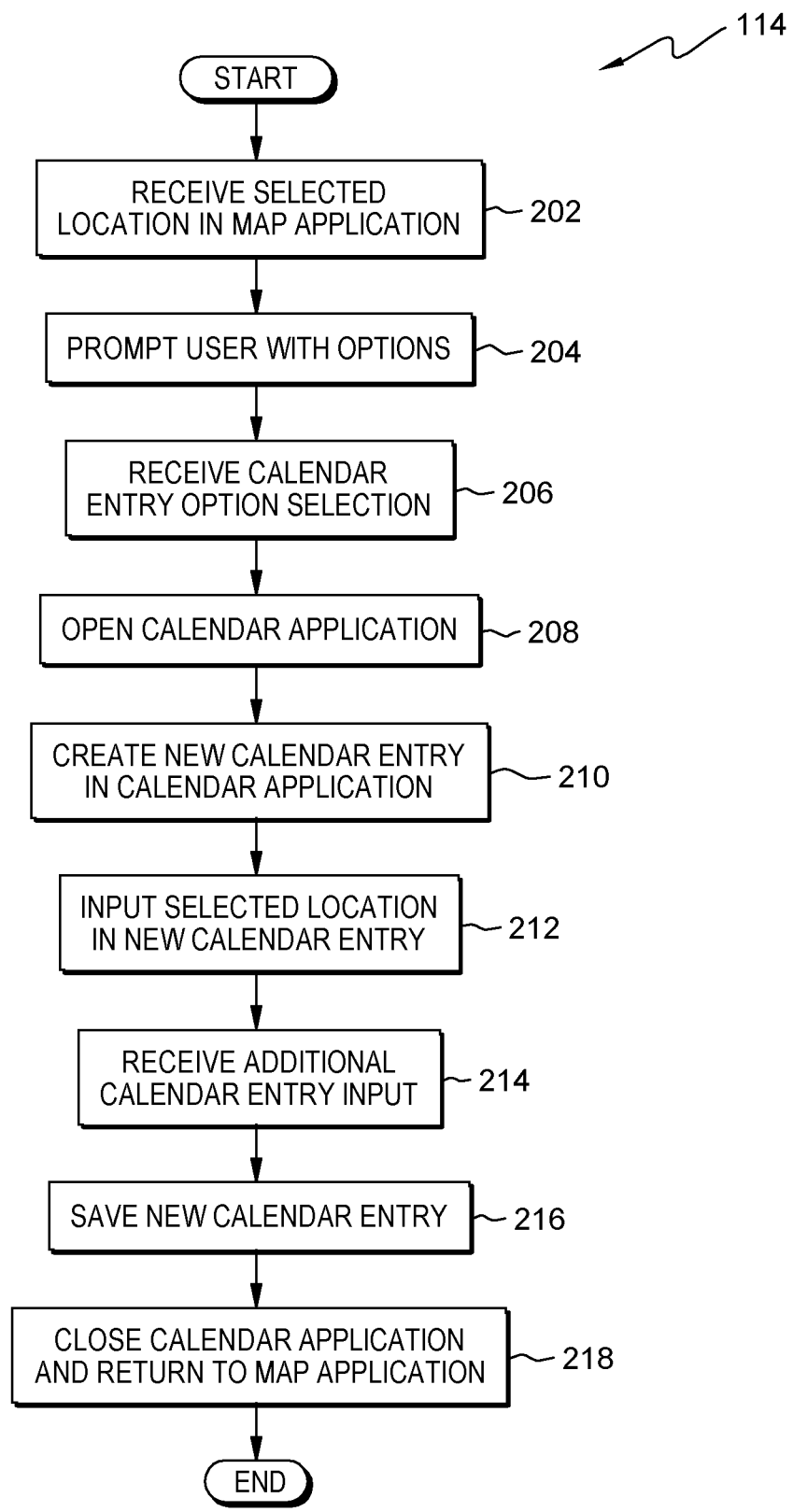
FIG. 2 is a flowchart depicting operational steps of a calendar entry program, on a server computer within the distributed data processing environment of FIG. 1, for creating a calendar entry based on interaction with a map application, in accordance with an embodiment of the present invention.

FIG. 2 is a flowchart depicting operational steps of calendar entry program 114, on server computer 108 within distributed data processing environment 100 of FIG. 1, for creating a calendar entry based on interaction with map application 112, in accordance with an embodiment of the present invention.

Calendar entry program 114 receives a selected location in map application 112 (step 202). A user opens map application 112, via map application user interface 106B, and begins viewing a displayed map or navigation instructions on client computing device 104. While using map application 112, the user sees a point of interest in a location on the map and decides to create a calendar entry based on the location. For example, the user sees a restaurant on the map and wants to create a calendar entry to meet friends there at a later date or time. In another example, the user looks at the map for a place to meet with a customer near the customer's office. As the user selects the location on the map, calendar entry program 114 receives the selected location. In an embodiment where client computing device 104 includes a touch screen, calendar entry program 114 receives the selected location when the user taps or performs a long press on the touch screen on the location displayed on the map. In an embodiment where client computing device 104 does not include a touch screen, calendar entry program 114 may receive the selected location by one or more of a plurality of methods known in the art, for example, a mouse click, a keystroke, a spoken word or number, or other means of a user indicating a selection with client computing device 104.

Calendar entry program 114 prompts the user with one or more options (step 204). In various map and/or navigation applications, such as map application 112, when a user selects a location on the map, the application may prompt the user with one or more options based on the location. For example, map application 112 may prompt the user to drop a pin in the location. In another example, map application 112 may prompt the user to set the selected location as a via point or end point in a route. In the present embodiment, calendar entry program 114 may prompt the user, via map application user interface 106B, with one or more options known in the art for map or navigation applications, however calendar entry program 114 also prompts the user with the option of creating a calendar entry based on the selected location. In one embodiment, calendar entry program 114 may prompt the user with the option to create a calendar entry without offering any additional options. In an embodiment, calendar entry program 114 may prompt the user to choose to create a calendar entry on a particular device associated with the user. For example, the user may have a calendar application on a smartphone for personal use and a different calendar application on a laptop for work. Calendar entry program 114 can prompt the user with options to create a calendar entry in one or more calendar applications on one or more devices. In one embodiment, calendar entry program 114 prompts the user with one or more options by displaying a dropdown list of the one or more options. In another embodiment, calendar entry program 114 may prompt the user by causing client computing device 104 to speak the one or more options using one or more natural language processing (NLP) or voice recognition techniques known in the art.

Calendar entry program 114 receives a calendar entry option selection (step 206). When the user chooses an option to create a calendar entry from a list of one or more options, via map application user interface 106B, calendar entry program 114 receives the selection. In an embodiment where client computing device 104 includes a touch screen, calendar entry program 114 receives the calendar entry selection when the user taps or performs a long press on the touch screen on the option displayed on the screen. In an embodiment where client computing device 104 does not include a touch screen, calendar entry program 114 may receive the calendar entry selection by one or more of a plurality of methods known in the art, for example, a mouse click, a keystroke, a spoken word or number, or other means of a user indicating a selection with client computing device 104. In a further embodiment, calendar entry program 114 may receive the calendar entry selection automatically, based on an action taken by the user. For example, if the user drops a pin in a selected location and then selects the pin again, calendar entry program 114 can receive a request for a new calendar entry. In another example, if calendar entry program 114 receives a long press on a selected location, then calendar entry program 114 can automatically receive a request for a new calendar entry, without providing options to the user, as discussed with respect to step 204.

Calendar entry program 114 opens calendar application 110 (step 208). Calendar entry program 114 opens calendar application 110 via calendar application user interface 106A. In an embodiment, calendar entry program 114 determines whether calendar application user interface 106A is open on client computing device 104. In the embodiment, if calendar entry program 114 determines calendar application user interface 106A is not open, then calendar entry program 114 opens calendar application user interface 106A. If calendar entry program 114 determines calendar application user interface 106A is already open, then calendar entry program 114 proceeds to step 210. In another embodiment, if calendar entry program 114 determines calendar application user interface 106A is not open, then calendar entry program 114 stores calendar entry information received in upcoming steps in database 116 until a time in the future when calendar application user interface 106A is open.

Calendar entry program 114 creates a new calendar entry in calendar application 110 (step 210). As would be recognized by one skilled in the art, calendar entry program 114 proceeds to open a new calendar entry in calendar application 110. In one embodiment, calendar entry program 114 automatically opens calendar application 110, if calendar application 110 is not already open, and creates a new calendar entry in response to receiving a selected location in map application 112. In another embodiment, calendar entry program 114 automatically opens calendar application 110, if calendar application 110 is not already open, and creates a new calendar entry in response to receiving a calendar entry option selection by the user, as discussed with respect to step 206. In one embodiment, calendar entry program 114 uses machine learning to determine a pattern of frequently traveled routes and frequently visited locations. Calendar entry program 114 may determine the pattern based on locations selected in map application 112. Calendar entry program 114 may also determine a pattern based on tracking the location of client computing device 104 via GPS coordinates. In the embodiment, calendar entry program 114 automatically creates a new calendar entry in calendar application 110 corresponding to a location associated with the pattern detected in map application 112.

Calendar entry program 114 inputs the selected location in the new calendar entry (step 212). Calendar entry program 114 fills in a location field of the new calendar entry with information corresponding to the location selected by the user in map application 112. In one embodiment, calendar entry program 114 inputs a name of the location in the calendar entry. For example, if the selected location is a restaurant, calendar entry program 114 inputs the name of the restaurant in the location field of the new calendar entry. In another embodiment, calendar entry program 114 may also input metadata associated with the location in the new calendar entry. For example, calendar entry program 114 may input the address of the location in the calendar entry. In another example, calendar entry program 114 may input GPS coordinates or latitude and longitude coordinates of the location in the calendar entry. In a further example, calendar entry program 114 may input a hot link to map application 112 which, upon selection by the user, displays a map and/or navigation instructions on client computing device 104 such that the user can find a route to the location when the event associated with the new calendar entry occurs.

Calendar entry program 114 receives additional calendar entry input (step 214). In one embodiment, calendar entry program 114 receives input to the calendar entry, in addition to the location, as the user fills in one or more fields. Fields may include, but are not limited to, entry title, date, start and end times, reminder notifications, invitee list, notes, attachments, etc. In another embodiment, calendar entry program 114 may provide default or pre-populated fields based on the user's preferences, stored in database 116. For example, the user may specify that if the selected location is a restaurant, the time duration of the calendar entry is 90 minutes, but if the selected location is an office, then the time duration of the calendar entry is 60 minutes. In another example, the user may specify that any time a particular location is selected, the invitee is a particular person. In the embodiment, fields may be editable such that the user can change one or more pre-populated fields as needed. In one embodiment, if a threshold number of default calendar entry fields are associated with the selected location, then calendar entry program automatically creates and saves the new calendar entry upon receiving the location selection without any further interaction with the user. In a further embodiment, calendar entry program 114 may detect other users in proximity to the user of client computing device 104, for example, by detecting the presence of one or more additional client computing devices by using NLP techniques to detect other voices in proximity to client computing device 104; wireless connectivity to another computing device, where the contact information for the computing device is stored in client computing device 104 (e.g., the smart phone of a friend); the GPS location of client computing device 104 is within a proximity distance to another computing device, where the contact information for the computing device is stored in client computing device 104 (e.g., the smart phone of a friend); or any other methods known in the art. In the embodiment, calendar entry program 114 automatically adds the one or more users in proximity to the user of client computing device 104 as invitees to the new calendar entry. In the embodiment, proximity may be defined as within a pre-defined distance from client computing device 104. In another embodiment, calendar entry program 114 may prompt the user as to whether or not to add the users to the new calendar entry.

Calendar entry program 114 saves the new calendar entry (step 216). Calendar entry program 114 stores the calendar entry in database 116. In one embodiment, calendar entry program 114 saves the new calendar entry in response to a prompt from the user, via calendar application user interface 106A. In another embodiment, calendar entry program 114 automatically saves the new calendar entry once a pre-defined threshold number of fields are filled in. In a further embodiment, calendar entry program 114 automatically saves the new calendar entry after a pre-defined duration of time has passed since calendar entry program 114 created the new calendar entry. In yet another embodiment, calendar application 110 saves the new calendar entry. In one embodiment, calendar entry program 114 calculates the expected travel time from a location of a calendar entry, previously stored in database 116, which is scheduled to occur just prior to the newly saved calendar entry, via one or more techniques known in the art, such as GPS coordinates, to determine whether the user will have sufficient time to travel to the location in the newly saved calendar entry. In the embodiment, if calendar entry program 114 determines there is not enough time to travel from the location of the first calendar entry to the location of the second calendar entry in the time allotted, then calendar entry program 114 may notify the user. In another embodiment, calendar entry program 114 calculates the expected travel time from the user's current location to the location selected for the new calendar entry, via GPS coordinates, past travel time history, or any method known in the art, to determine whether the user will have sufficient time to travel to the location in the newly saved calendar entry by the start time saved in the new calendar entry. In the embodiment, if calendar entry program 114 determines there is not enough time to travel from the user's current location to the location of the new calendar entry in the time allotted, then calendar entry program 114 may notify the user. In a further embodiment, if calendar entry program 114 determines the user will be late to an event in a calendar entry, then calendar entry program 114 can notify one or more participants or invitees listed in the calendar entry that the user will be late to the event. The notification may include a plurality of details, for example, the notification can include, but is not limited to, an estimated time of arrival, a new start time for the event, or the user's current location. In another example, if calendar entry program 114 determines the user will be late due to traffic, the notification may include information about the traffic.

Calendar entry program 114 closes calendar application 110 and returns to map application 112 (step 218). In response to saving the new calendar entry, calendar entry program 114 closes calendar application 110 and displays map application 112, via map application user interface 106B, in the same context in which map application 112 existed when calendar entry program 114 navigated away from map application 112 to create the new calendar entry. For example, if the user was utilizing map application 112 for navigation just before calendar entry program 114 created the new calendar entry, then calendar entry program 114 returns the user to the navigation that was in progress. In another example, if the user was utilizing map application 112 to browse a map just before calendar entry program 114 created the new calendar entry, then calendar entry program 114 returns the user to the map that was displayed previously. In one embodiment, calendar entry program 114 may leave calendar application 110 open and return to map application 112.

In an example, a user utilizes map application user interface 106B to navigate to a restaurant. Upon inputting the name of the restaurant in map application user interface 106B, map application user interface 106B displays the location of the restaurant on an electronic map. While viewing the map, the user sees a store on the map and remembers that the user has to pick up a package at that store the following Wednesday, after work. The user selects the store in map application user interface 106B and calendar entry program 114 receives the selected location, as discussed with respect to step 202 of FIG. 2. Calendar entry program 114 prompts the user with a list of options, and the user selects "calendar entry," as discussed with respect to steps 204 and 206 of FIG. 2. Calendar entry program 114 opens calendar application 110 and displays calendar application user interface 106A, as discussed with respect to step 208 of FIG. 2. Calendar entry program 114 creates a new calendar entry and inputs the selected location, i.e., the store location information, into the new calendar entry in the location field, as discussed with respect to step 210 and 212 of FIG. 2. The user fills in the remaining fields associated with the new calendar entry, and prompts calendar entry program 114 to save the new calendar entry, as discussed with respect to steps 214 and 216 of FIG. 2. Once the new calendar entry is saved, calendar entry program 114 navigates back to map application 112 and displays map application user interface 106B such that the user can continue to navigate to the original location, i.e., the restaurant.

Although some aspects of calendar applications and some aspects of map or navigation applications are known in the art, embodiments of the present invention enable functional integration between selection of a location from a map or navigation application, and in some embodiments, subsequent to confirmation of an option to include the selected location in a calendar entry, automatically generating a calendar entry that includes information corresponding to the location selected from the map or navigation application. This enables a computer technology function that is otherwise only accomplished by tedious manual entry, or copy from one application to another. Manual entry is prone to error, exclusion of complete information, or avoided altogether. Embodiments of the present invention improve the efficiency of an electronic device and user interfaces.

In an alternate embodiment, a user may initially launch calendar application 110, via calendar application user interface 106A, to create a new calendar entry. When the user selects the location field in the new calendar entry, calendar entry program 114 prompts the user with an option to select the location from a map. Calendar entry program 114 receives a selection of the map option and subsequently launches map application 112. Calendar entry program 114 receives a selection of a location on the map, via map application user interface 106B, and inputs the selected location in the new calendar entry, as discussed with respect to steps 202 and 212. Calendar entry program 114 then proceeds with steps 214 and 216, as described earlier.

Figure 3:
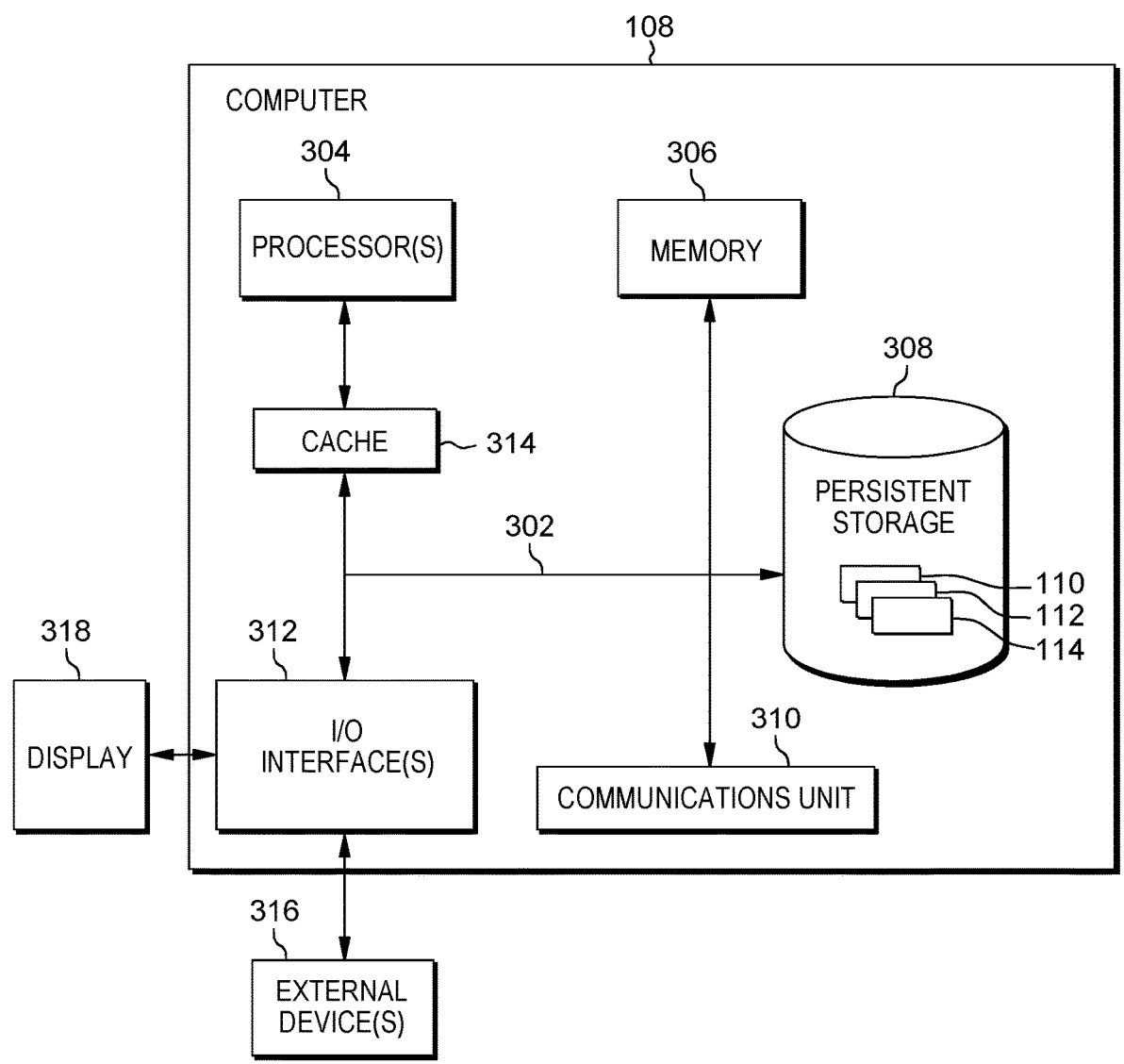
FIG. 3 depicts a block diagram of components of the server computer executing the calendar entry program within the distributed data processing environment of FIG. 1, in accordance with an embodiment of the present invention.

FIG. 3 depicts a block diagram of components of server computer 108 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 108 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., calendar entry program 114 and database 116, are stored in persistent storage 308 for execution and/or access by one or more of the respective processor(s) 304 of server computer 108 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of client computing device 104. In these examples, communications unit 310 includes one or more network interface cards. Communications unit 310 may provide communications through the use of either or both physical and wireless communications links. Calendar entry program 114, database 116, and other programs and data used for implementation of the present invention, may be downloaded to persistent storage 308 of server computer 108 through communications unit 310.

I/O interface(s) 312 allows for input and output of data with other devices that may be connected to server computer 108. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., calendar entry program 114 and database 116 on server computer 108, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touch screen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
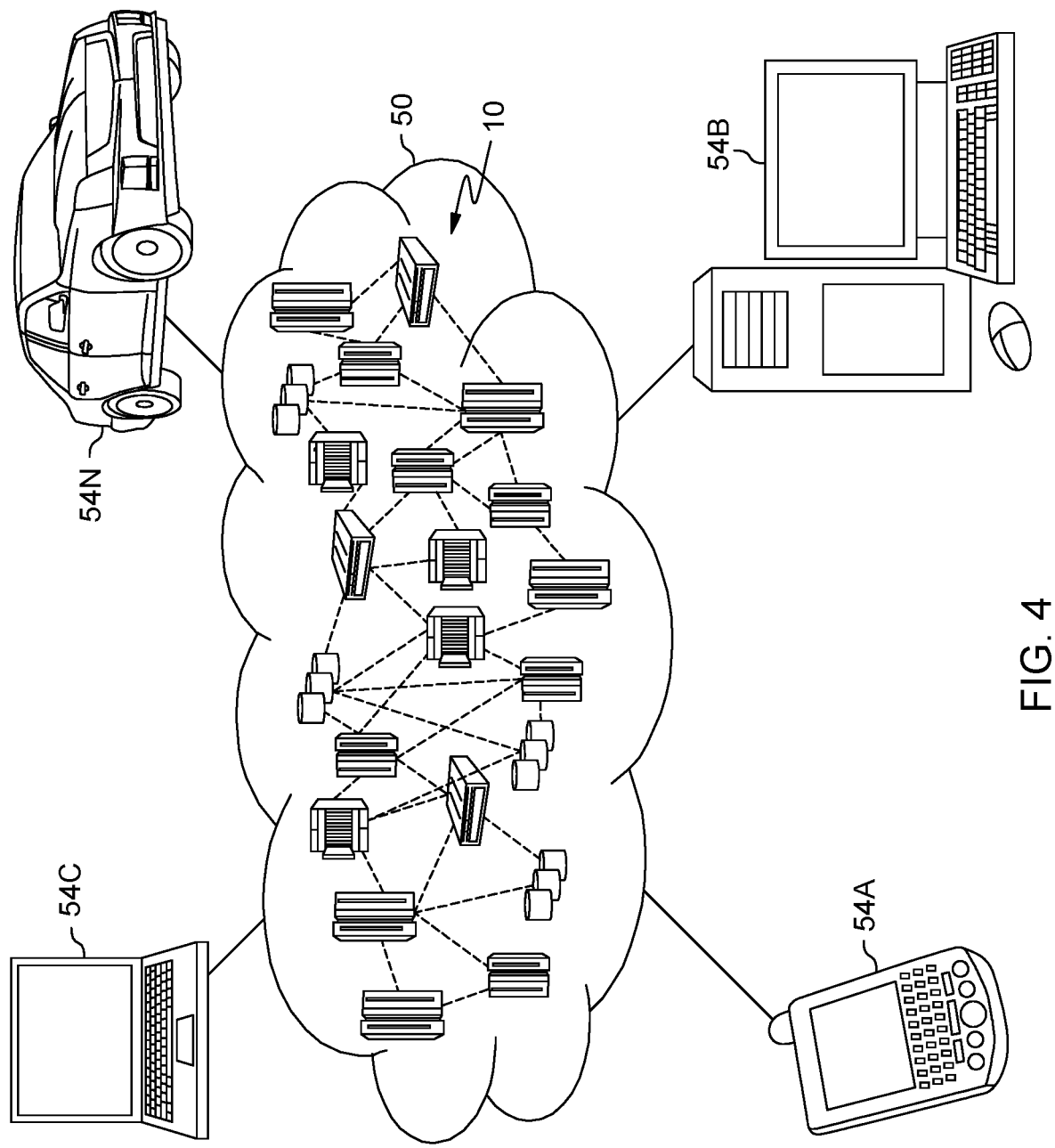
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
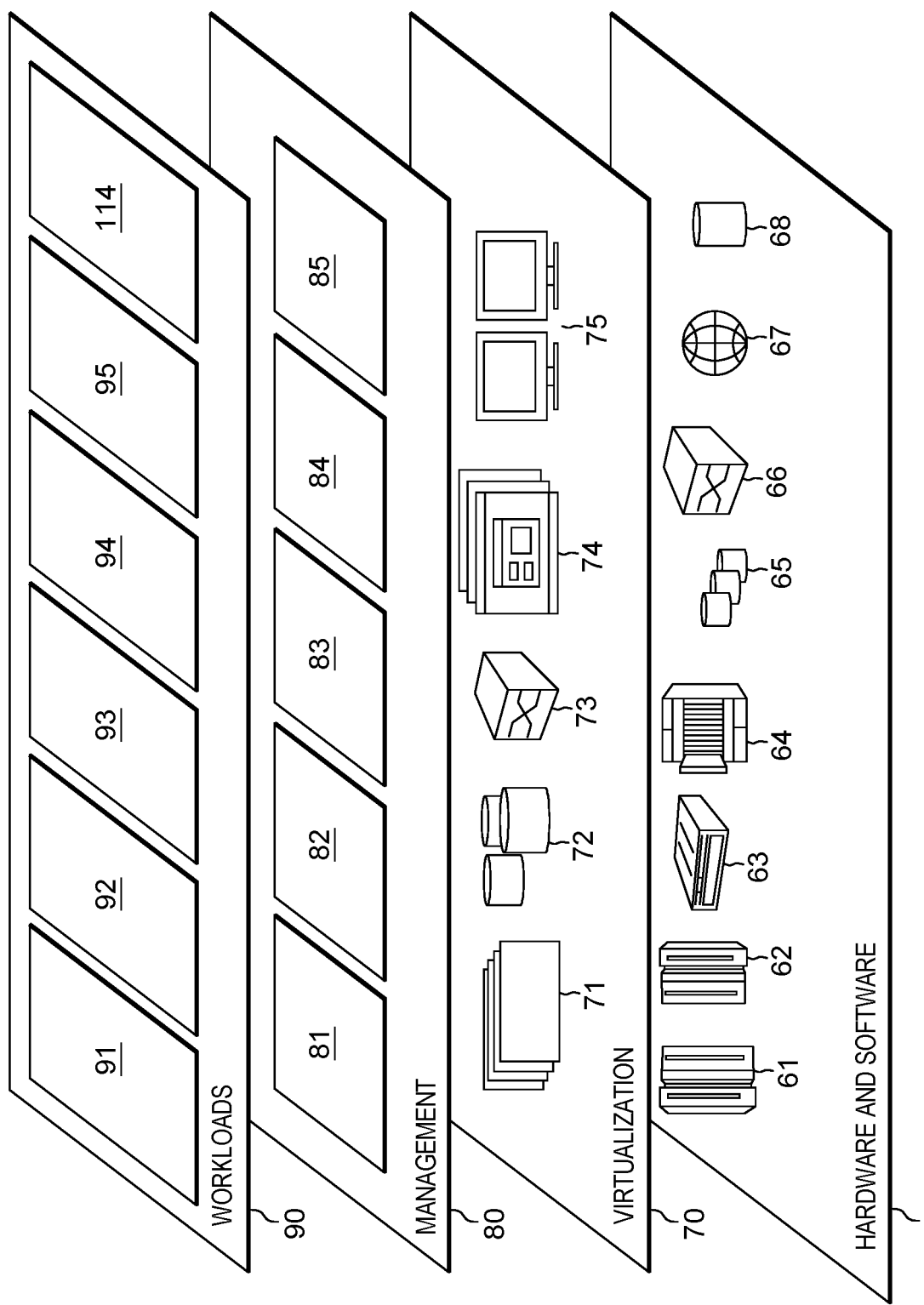
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and calendar entry program 114.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating an electronic calendar entry, the method comprising:
   receiving, by one or more computer processors, a selection of a location from an electronic map in a map application from a first device associated with a first user;
   displaying, by the one or more computer processors, to the first user a list of one or more electronic calendar applications available on one or more devices, wherein the one or more devices include the first device;
   receiving, by the one or more computer processors, a selection of one of the one or more electronic calendar applications and a selection of one of the one or more devices on which to open the selected electronic calendar application;
   based on the selected location in the map application from the first device associated with the first user, creating, by the one or more computer processors, a first calendar entry associated with the selected location in the selected electronic calendar application associated with the first user;
   inputting, by the one or more computer processors, information corresponding to the selected location in the first calendar entry, wherein the information corresponding to the selected location includes a hot link to the selected location in the map application; and
   storing, by the one or more computer processors, the first calendar entry.

2. The method of claim 1, further comprising, opening, by the one or more computer processors, the electronic calendar application associated with the first user.

3. The method of claim 2, further comprising:
   receiving, by the one or more computer processors, additional input to the first calendar entry;
   closing, by the one or more computer processors, the electronic calendar application; and
   displaying, by the one or more computer processors, the map application in a same context in which the map application existed prior to receiving the selection of the location.

4. The method of claim 3, wherein the additional input to the first calendar entry is selected from the group consisting of an entry title, a date, a start time, an end time, a reminder notification, an invitee list, a note, and an attachment.

5. The method of claim 1, further comprising:
   responsive to receiving the selection of the location in the map application, prompting, by the one or more computer processors, the first user with one or more options, wherein in one of the one or more options is an option to create a calendar entry; and receiving, by the one or more computer processors, a selection of the option to create a calendar entry.

6. The method of claim 1, wherein information corresponding to the selected location is selected from the group consisting of an address, a location description, a GPS coordinate, a latitude coordinate, a longitude coordinate, and an information of relative proximity to another location or object.

7. The method of claim 1, further comprising, populating, by the one or more computer processors, one or more fields of the first calendar entry based on one or more preferences of the first user, wherein the one or more preferences include choosing one or more fields to pre-populate based on a device associated with the user and choosing an electronic calendar application based on a type of calendar entry.

8. The method of claim 1, wherein storing the first calendar entry further comprises, determining, by the one or more computer processors, that a number of fields in the calendar entry that are filled in meets a pre-defined threshold.

9. The method of claim 1, further comprising, prior to receiving the selection of the location in the map application from the first device associated with the first user, opening, by the one or more computer processors, the map application associated with the first user.

10. The method of claim 1, further comprising:
detecting, by the one or more computer processors, one or more additional users within a pre-defined distance from the first device; and
adding, by the one or more computer processors, at least one of the one or more detected additional users as an invitee in the first calendar entry.

11. The method of claim 1, wherein storing the first calendar entry further comprises, determining, by the one or more computer processors, that a pre-defined duration of time has passed since the first calendar entry was created.

12. A computer program product for creating an electronic calendar entry, the computer program product comprising:
one or more computer readable storage devices and program instructions stored on the one or more computer readable storage devices, the stored program instructions comprising:
program instructions to receive a selection of a location from an electronic map in a map application from a first device associated with a first user;
program instructions to display to the first user a list of one or more electronic calendar applications available on one or more devices, wherein the one or more devices include the first device;
program instructions to receive a selection of one of the one or more electronic calendar applications and a selection of one of the one or more devices on which to open the selected electronic calendar application;
based on the selected location in the map application from the first device associated with the first user, program instructions to create a first calendar entry associated with the selected location in the electronic calendar application associated with the first user;
program instructions to input information corresponding to the selected location in the first calendar entry, wherein the information corresponding to the selected location includes a hot link to the selected location in the map application; and
program instructions to store the first calendar entry.

13. The computer program product of claim 12, further comprising, program instructions to open the electronic calendar application associated with the first user.

14. The computer program product of claim 13, the stored program instructions further comprising:

program instructions to receive additional input to the first calendar entry;
program instructions to close the electronic calendar application; and
program instructions to display the map application in a same context in which the map application existed prior to receiving the selection of the location.

15. The computer program product of claim 12, the stored program instructions further comprising:
responsive to receiving the selection of the location in the map application, program instructions to prompt the first user with one or more options, wherein in one of the one or more options is an option to create a calendar entry; and
program instructions to receive a selection of the option to create a calendar entry.

16. A computer system for creating an electronic calendar entry, the computer system comprising:
one or more computer processors;
one or more computer readable storage devices;
program instructions stored on the one or more computer readable storage devices for execution by at least one of the one or more computer processors, the stored program instructions comprising:
program instructions to receive a selection of a location from an electronic map in the map application from a first device associated with a first user;
program instructions to display to the first user a list of one or more electronic calendar applications available on one or more devices, wherein the one or more devices include the first device;
program instructions to receive a selection of one of the one or more electronic calendar applications and a selection of one of the one or more devices on which to open the selected electronic calendar application;
based on the selected location in a map application from the first device associated with the first user, program instructions to create a first calendar entry associated with the selected location in the electronic calendar application associated with the first user;
program instructions to input information corresponding to the selected location in the first calendar entry, wherein the information corresponding to the selected location includes a hot link to the selected location in the map application; and
program instructions to store the first calendar entry.

17. The computer system of claim 16, further comprising, program instructions to open the electronic calendar application associated with the first user.

18. The computer system of claim 17, the stored program instructions further comprising:
program instructions to receive additional input to the first calendar entry;
program instructions to close the electronic calendar application; and
program instructions to display the map application in a same context in which the map application existed prior to receiving the selection of the location.

19. The computer system of claim 16, the stored program instructions further comprising:
responsive to receiving the selection of the location in the map application, program instructions to prompt the first user with one or more options, wherein in one of the one or more options is an option to create a calendar entry; and
program instructions to receive a selection of the option to create a calendar entry.

* * * * *